O. W. TOWNSEND.
CORE-AUGER.

No. 171,194.      Patented Dec. 14, 1875.

Witnesses.
A. Ruppert.
J. W. Kister

Owen W. Townsend
Inventor.

UNITED STATES PATENT OFFICE.

OWEN W. TOWNSEND, OF FOND DU LAC, WISCONSIN.

IMPROVEMENT IN CORE-AUGERS.

Specification forming part of Letters Patent No. 171,194, dated December 14, 1875; application filed June 3, 1875.

*To all whom it may concern:*

Be it known that I, OWEN W. TOWNSEND, of Fond du Lac, in the county of Fond du Lac and State of Wisconsin, have invented certain new and useful Improvements in Core-Augers; and I do hereby declare that the following is a full, clear, and exact description thereof, which will enable others skilled in the art to which it pertains to make and use the same, reference being had to the accompanying drawing, and to the letters of reference marked thereon, which form a part of this specification, in which—

Figure 1:
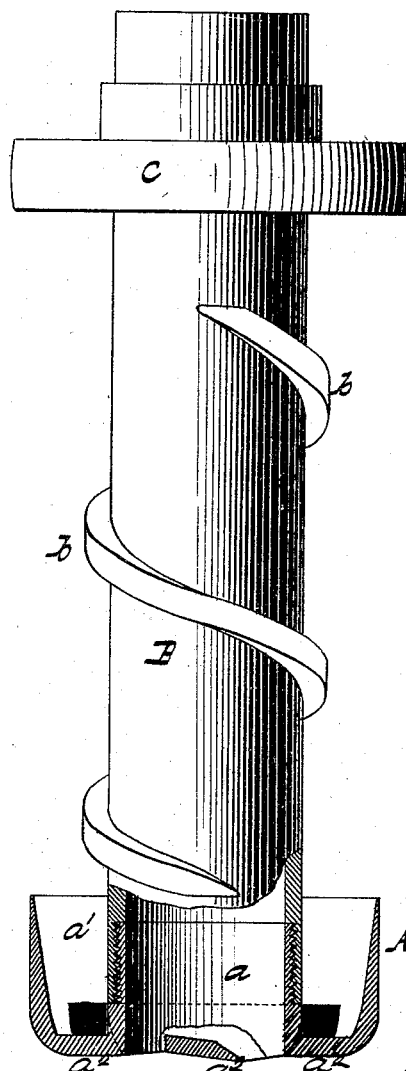
Figure 2:
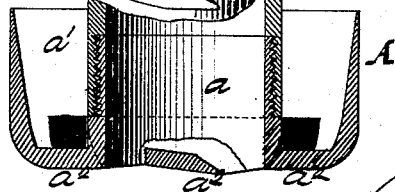
Figure 3:
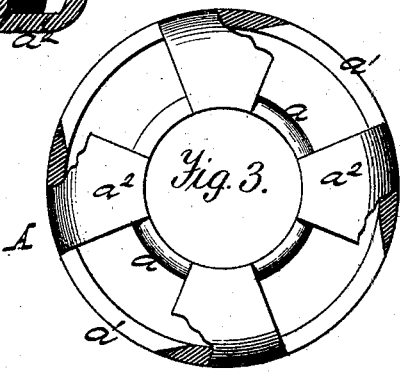

Figure 1 is an elevation of my improved core-auger with its cutter-head in section. Figs. 2 and 3 are detached views of the cutter-head.

Corresponding parts in the several figures are designated by like letters.

This invention is designed to facilitate the delivery of the shavings and to cut a core. To this end it consists in the construction of the cutter-head, its inner ring, to which, and an outer one, the knives are fixed, being beveled or chamfered, at its lower edge, upon the inner side, and the outer one, at its upper edge, upon the same side, substantially as hereinafter more fully set forth.

In the annexed drawing, A refers to the cutter-head, whose inner ring, $a$, threaded and otherwise adapted to permit of its attachment to the core-tube B, is chamfered or beveled at its lower edge.

Having thus described my invention, what I claim, and desire to secure by Letters Patent, is—

The cutter-head A, having its inner ring $a$ beveled or chamfered at its lower edge, and its outer ring $a'$ at its upper edge, substantially as shown and specified, and for the purpose set forth.

In testimony that I claim the foregoing as my own, I affix my signature in presence of two witnesses.

OWEN W. TOWNSEND.

Witnesses:
J. W. MISTER,
JOS. R. EDSON.